United States Patent
Harper et al.

(10) Patent No.: US 6,629,266 B1
(45) Date of Patent: Sep. 30, 2003

(54) METHOD AND SYSTEM FOR TRANSPARENT SYMPTOM-BASED SELECTIVE SOFTWARE REJUVENATION

(75) Inventors: Richard Edwin Harper, Chapel Hill, NC (US); Steven Wade Hunter, Raleigh, NC (US); Thomas Dixon Pahel, Jr., Raleigh, NC (US); Kalyanaraman Vaidyanathan, Durham, NC (US); William Paul Zeggert, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,001

(22) Filed: Nov. 17, 1999

(51) Int. Cl.[7] .............................................. G06F 11/34
(52) U.S. Cl. ........................................ 714/38; 714/47
(58) Field of Search ............................ 714/13, 15, 38, 714/47, 26

(56) References Cited

U.S. PATENT DOCUMENTS

| | | | |
|---|---|---|---|
| 5,715,386 A | 2/1998 | Fulton, III et al. | |
| 5,748,882 A | 5/1998 | Huang | |
| 6,112,136 A | * 8/2000 | Paul et al. | 700/293 |
| 6,172,673 B1 | * 1/2001 | Lehtinen et al. | 345/716 |

OTHER PUBLICATIONS

Vaidyanathan, Kalyanaraman et al.; A Measurement–Based Model for Estimation for Resource Exhaustion in Operational Software Systems; Nov. 1–4, 1999; International Symposiom of Software Reliability Engineering 1999. Proceedings; p. 84–93.*

Huang, Yennun et al.; Software Rejuvenation: Analysis, Module and Applications; Jun. 27–30, 1995; Twenty–fifth International Symposium on Fault Tolerant Computing, 1995; FTCS–25 Digest Papers; p. 381–390.*

Garg, Sachin et al.; On the Analysis of Software Rejuvenation Policies; Jun. 16–19, 1997; Proceedings of the 12th Annual Conference on Computer Assurance, 1997; COMPASS '97 Are We Making Progress Towards Computer Assurance?; p. 88–96.*

Garg, Sachin et al.; Analysis of Software Rejuvenation using Markov Regenerative Stochastic Petri Net; Oct. 24–27, 1995; Internationalo Symposium on Software Reliability Engineering, 1995; Proceedings; p. 180–187.*

Wang, Yi–Min, et al., "Checkpointing and Its Applications", Jun. 27–30, 1995; Twenty–Fifth International Symposium on Fault–Tolerant Computing, IEEE, 1995; FTCS–25 Digest Papers; pp. 22–31.

Tai, Ann T., et al., "On–Board Preventive Maintenance for Long–Life Deep Space Missions: A Model–Based Analysis", Sep. 7–9, 1998: IEEE International Computer Performance and Dependability Symposium, 1998; IDPS '98 Proceedings; pp. 196–205.

N.R. Draper et al., "Applied Regression Analysis", Second Edition, John Wiley & Sons, Inc. pp. 294–343, with Preface.

Garg, et al., "A Methodology for Detection and Estimation of Software Aging",In Proceedings of the Ninth Int'l Symposium of Software Reliability Engineering, Paderborn, Germany, Nov. 1998, pp. 1–10.

* cited by examiner

Primary Examiner—Scott Baderman
Assistant Examiner—Joshua Lohn
(74) Attorney, Agent, or Firm—McGinn & Gibb, PLLC; Gail H. Zarick, Esq.

(57) ABSTRACT

A method (and system) for increased software dependability, includes learning how to predict an outage of a software system running on a computer, and, based on the learning, predicting an imminent outage, and avoiding the outage.

42 Claims, 11 Drawing Sheets

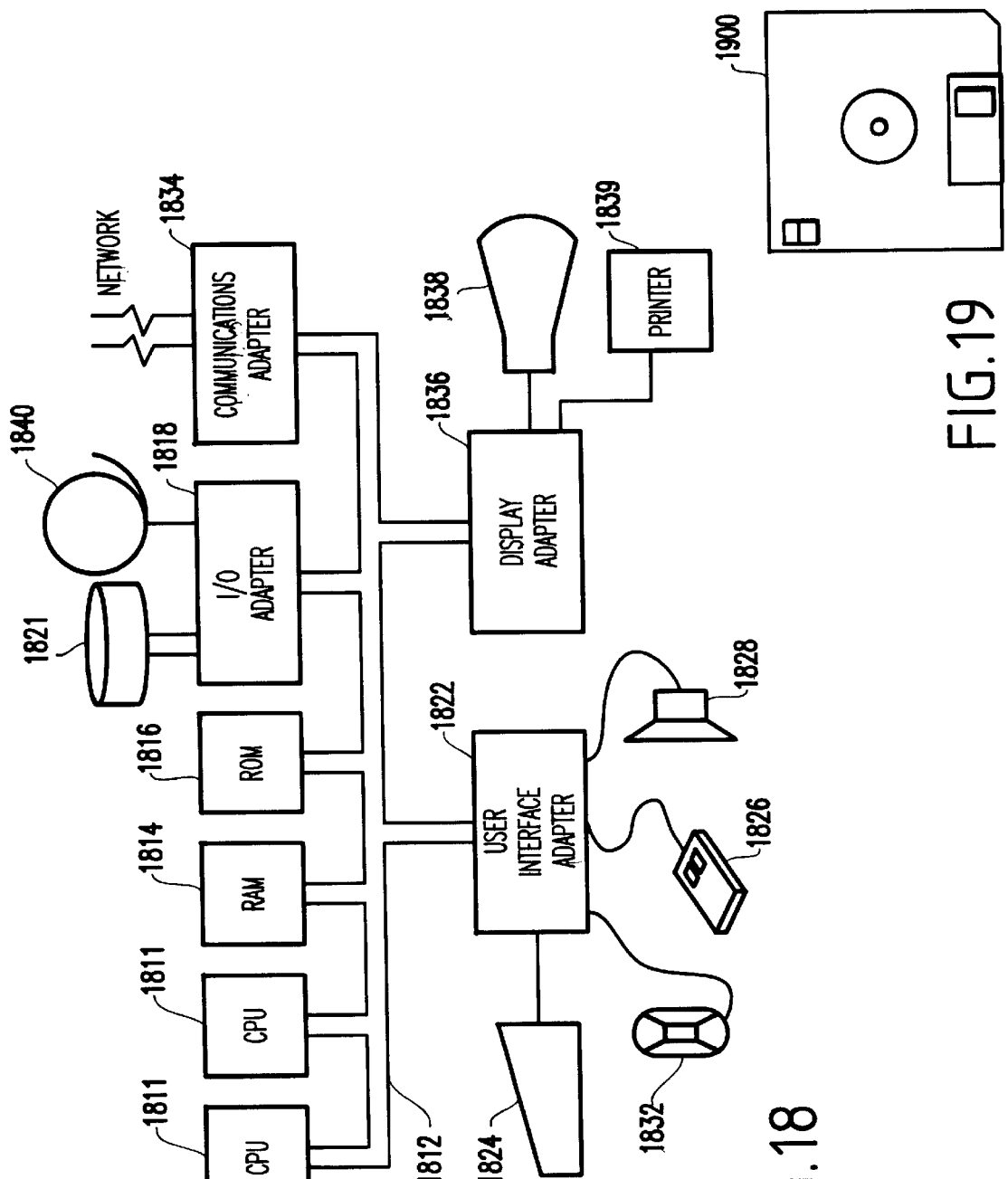

METHOD AND SYSTEM FOR TRANSPARENT SYMPTOM-BASED SELECTIVE SOFTWARE REJUVENATION

The present application is related to U.S. patent application Ser. No. 09/442,003, filed on Nov. 17, 1999, to Harper et al., entitled "METHOD AND SYSTEM FOR TRANSPARENT TIME-BASED SELECTIVE SOFTWARE REJUVENATION" having IBM Docket No. YOR999-424, assigned to the present assignee, and incorporated herein by reference.

BACKGROUND OF THE INVENTION

1. Field of the Invention

The present invention relates to software rejuvenation, and more particularly to transparent symptom-based selective software rejuvenation.

2. Description of the Related Art

The software executing in computer and networking systems can exhibit a behavior such that its failure rate increases over time, typically because of programming errors that generate increasing and unbounded resource consumption, or due to data corruption and numerical error accumulation (e.g., round-off errors). Examples of the effects of such errors are memory leaks, file systems that fill up over time, and spawned threads or processes that are never terminated.

The above-mentioned effects constitute a phenomenon known as "software aging," and may be caused by errors in either application, middleware, or operating system software. As the allocation of a system's resources gradually approaches a critical level, the probability that the system will suffer an outage increases. This may be viewed as an increase in the software system's failure rate. Such a software system failure may result in overall system failure, "crashing", "hanging", performance degradation, etc.

One way of reducing the software's failure rate is to reset a portion of the system to recover any lost and unused resources. For example, this may be resetting just the application that is responsible for the aging, or it may be resetting the entire computer system. This is referred to as "software rejuvenation." When only a part of the system is selected for rejuvenation, this is called "selective rejuvenation." FIG. 1 is a diagram showing the relationship of the software failure rate over time. As shown software ages over time as shown by reference numeral 100, and the effects of software rejuvenations are shown at reference numeral 110.

When the part of the system that is undergoing aging is reinitialized via rejuvenation, its failure rate falls back to its initial (e.g., lower), level because resources have been freed up and/or the effects of numerical errors have been removed. This has a dramatic effect on overall system availability. However, when the failure rate begins to climb again due to the above-mentioned causes, subsequent rejuvenations become necessary.

The transparent nature of this function is partly achieved by being incorporated into a management framework separate and independent of the operating system and application. This approach not only assists in providing transparency, but also allows for portability and interoperability across multiple operating systems. This is important as it is becoming more common for systems management to span multiple platforms in the enterprise.

It should be noted that error-induced resource exhaustion is a fundamentally different phenomenon from performance-based capacity exhaustion. "Error-induced resource exhaustion" is due to the causes outlined above and its effects can be eliminated temporarily by rejuvenation. "Performance-based capacity exhaustion" results from increases in performance requirements over time, and its effects can only be eliminated by reducing the computational performance requirements or adding new resources to the system.

In a conventional method and system, a time-based rejuvenation is performed within a single node and a multi-node environment. However, the conventional method and system assumes that the application must be modified to include calls to a fault tolerance library. Thus, modification of the application software source code is required. This is problematic because if the application source or executable code must be modified, then software rejuvenation technology cannot be applied to the broad class of applications for which the source or executable code cannot be economically modified, such as "shrink-wrapped" applications. Transparency, e.g., the lack of necessity to modify the application source or executable code, allows software rejuvenation to be applied to any application, regardless of whether the code can be modified or not. This extends its applicability to essentially all applications that can be executed on the computer system.

Additionally, the conventional method typically requires a proprietary dedicated system support for the rejuvenation functionality. Thus, the conventional methods and systems significantly restrict the rejuvenation's potential applicability and ease of use to systems that support the proprietary rejuvenation functionality.

In the above-mentioned co-pending application, it was described how to periodically rejuvenate all or part of a software system to reduce its failure rate to its initial, lower level, based on time.

However, in the co-pending application, there is no mechanism to notify the system operator to only rejuvenate prior to an unplanned outage, as opposed to at statically predetermined intervals.

Further, some system outages are characterized by not just one parameter reaching an extreme value, but by several values reaching a characteristic region in which not all values may be global extreme. In these cases, single-parameter extremes monitoring is ineffective.

Further, hitherto the invention, there has been a problem of predicting impending resource exhaustion. Some methods monitor a small number of key resource parameters of the operating system (e.g., the UNIX operating system), performing trend detection and slope estimation for those parameters, and projecting the mean time to their exhaustion based on the extrapolated trend. However, this technique has been limited to confirming the existence of software aging due to resource exhaustion. In this approach, there has been no successful prediction of outage since only individual indicators of outage are examined independently. There has been no approach of examining several indicators in combination to form a predictor of outage, even though none is necessarily at a global extreme.

Finally, the conventional methods have been unable to pinpoint and identify which subsystem, process, and thread are causing the exhaustion, and selectively rejuvenate solely the offending function.

SUMMARY OF THE INVENTION

In view of the foregoing and other problems, disadvantages, and drawbacks of the conventional methods and structures, an object of the present invention is to provide a method and system for predicting outages of a software system.

Another object is to provide a method and system for providing non-intrusive symptom-based prediction (and subsequent rejuvenation) of unplanned software outages.

In a first aspect of the invention, a method (and system) for increased software dependability, includes learning how to predict an outage of a software system running on a computer, based on the learning, predicting an imminent outage, and avoiding the outage.

In a second aspect of the invention, a method for software rejuvenation, includes waiting for symptoms associated with an outage of the software, determining whether a fail-to node has adequate resources to accept a failover workload, if the determining determines that the fail-to node cannot accept the failover workload, sending an alert that adequate redundancy does not exist to support fault tolerance requirements, and suspending rejuvenation until an operator acknowledges and corrects the deficiency.

In another aspect of the invention, a signal-bearing medium (e.g., storage medium) is provided for storing a program representing the inventive method.

Thus, the present invention provides symptom-based rejuvenation in several environments (e.g., the preferred embodiment being within a clustered environment). In the invention, the application need not be modified or to include calls to a fault tolerance library. Indeed, no such modification is necessary, and applications obtain the benefits of software rejuvenation without any modification. In addition, no proprietary, dedicated system support is required for the rejuvenation functionality. The use of rejuvenation by the invention is performed within the context of any industry-standard clustering environment. These enhancements significantly expand rejuvenation's potential applicability and ease of use.

Further, the present invention can predict impending resource exhaustion and aging due to resource exhaustion by incorporating the effects of variance on an extrapolated trend, incorporating time integral tests for secondary indicators, and including increased degrees of variance as symptomatic of outages. The multivariate approach of the present invention is especially effective when several indicators combine to form a predictor of outage, where no one indicator is necessarily at a global extremum. Finally, the provided indicators are used to identify which subsystem, process, and thread are causing the exhaustion.

Transparent Symptom-Based Selective Software Rejuvenation (SSR), according to the present invention, expands time-based rejuvenation by providing how to rejuvenate only prior to an unplanned outage, as opposed to rejuvenating periodically (e.g., at statically predetermined periods) as in the co-pending application.

Additionally, it allows the operator to identify exactly (e.g., pinpoint) which subsystem (and/or process and/or thread) is responsible for the exhaustion, opening up the possibility of only rejuvenating the offending subsystem. This is achieved by non-intrusively monitoring and analyzing the state of a software system so as to predict an impending resource exhaustion-induced outage.

Thus, for example, consider the possibilities of 1) a memory leak with no corruption to the rest of the system, 2) an error not contained and thereby the system has been contaminated, and 3) the intermediate case of a small amount of leakage occurring which over time may contaminate the entire system.

In the first case, only the thread or subsystem need be rejuvenated and the effects of the leak will have been eliminated. In the second case, the entire system would need to be rejuvenated to eliminate the effects of the leak. In the third case, the rejuvenation could be performed selectively at a time least disruptive to the system, with the operator knowing that over time more subsystems/threads would have to be rejuvenated; the earlier the rejuvenation, the less disruptive the rejuvenation would be, and the later the rejuvenation, the more of the system would have to be rejuvenated. Selection of the amount of time to rejuvenation in this case (and the resultant risk of an outage) could be at the discretion of the operator.

The present invention uses existing resource monitoring mechanisms provided by an operating system to non-intrusively monitor system resources such as file space, handles, threads, free virtual memory, and system memory. Several techniques, as described below, can then be used to aggregate these indicators into a reliable predictor of impending outage. When an analytical aggregate of these indicators approaches a region associated with increased likelihood of unplanned outage, the system operator can be notified and then can initiate a graceful planned outage instead of an ungraceful unplanned outage.

Symptom-based prediction of unplanned software outages can be beneficially combined with some concepts of time-based software rejuvenation, for example by suggesting to the operator that rejuvenation occur during the next acceptable interval defined under a time-based software rejuvenation management policy.

Additionally, when symptom-based software rejuvenation discovers that a resource exhaustion condition is developing, an additional function provided by the present invention is capable of determining which subsystem, process, and thread (e.g., rejuvenation can be performed at a granular level) is responsible for the exhaustion condition and selectively causing only that part of the system to be rejuvenated, assuming the underlying system has this capability.

With the unique and unobvious aspects of the present invention, unplanned outages due to resource exhaustion are avoided by non-intrusively monitoring the state of a computer system and, based on indicative symptoms, and by signaling an impending unplanned outage to the operator or cluster management software in time to perform a graceful rejuvenation. This benefit is provided transparently to the application software.

Rejuvenation can increase a system's mean-time-to-outage by a factor of two or more (e.g., based on an analytical model), depending on the degree of aging. Once it has been set up, the rejuvenation process is completely automated and therefore not susceptible to human error, either in terms of forgetting to perform the rejuvenation, or in terms of errors in performing the rejuvenation itself.

Additionally, similarly to a time-based system as described in the co-pending application, rejuvenation can be scheduled to occur at a time of least system workload, when an operator may not be present. Selective rejuvenation allows the operator to only rejuvenate that part of the system that is the cause of the aging, further reducing any impact on system operation. Because transparent rejuvenation requires no modifications to the application software, it can be used for any application running on the system, without modification.

Because the present invention can use the fail-over capabilities of a clustered system, very little downtime is incurred to perform the rejuvenation. Finally, the invention provides an automatic and continual check on the system's capability to tolerate an unplanned failure.

BRIEF DESCRIPTION OF THE DRAWINGS

The foregoing and other purposes, aspects and advantages will be better understood from the following detailed description of preferred embodiments of the invention with reference to the drawings, in which:

FIG. 18 illustrates an exemplary hardware/information handling system for incorporating the present invention therein; and FIG. 19 illustrates a signal bearing medium (e.g., storage medium) for storing steps of a program for symptom-based software rejuvenation according to the present invention.

DETAILED DESCRIPTION OF PREFERRED EMBODIMENTS OF THE INVENTION

Figure 1:
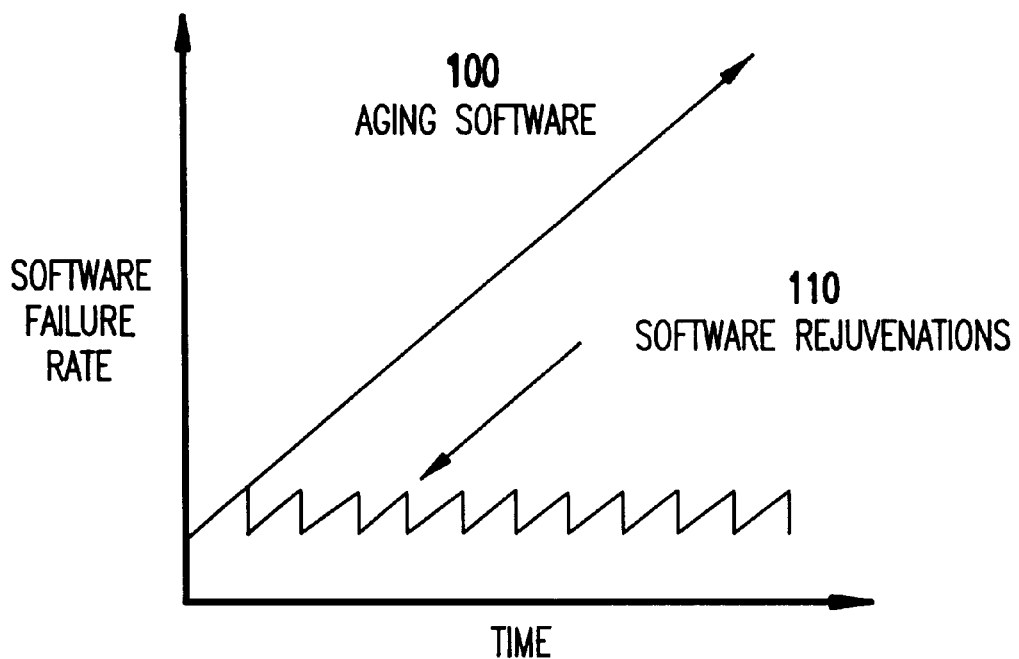
FIG. 1 is a diagram showing a relationship between the software failure rate over time.

Referring now to the drawings, and more particularly to FIGS. 2–19, there is shown a preferred embodiment of the method and structure according to the present invention.

Referring to FIGS. 2–12, an embodiment of the present invention will be described below.

First, prior to describing the preferred embodiment in detail, it is noted that although transparent software rejuvenation according to the present invention works well and provides benefits within the environment of a single stand-alone computer node, preferably the invention is implemented in the context of a cluster environment. Thus, as described below, the preferred embodiment will be described below within the context of a cluster environment, as shown in FIG. 2.

Figure 2:
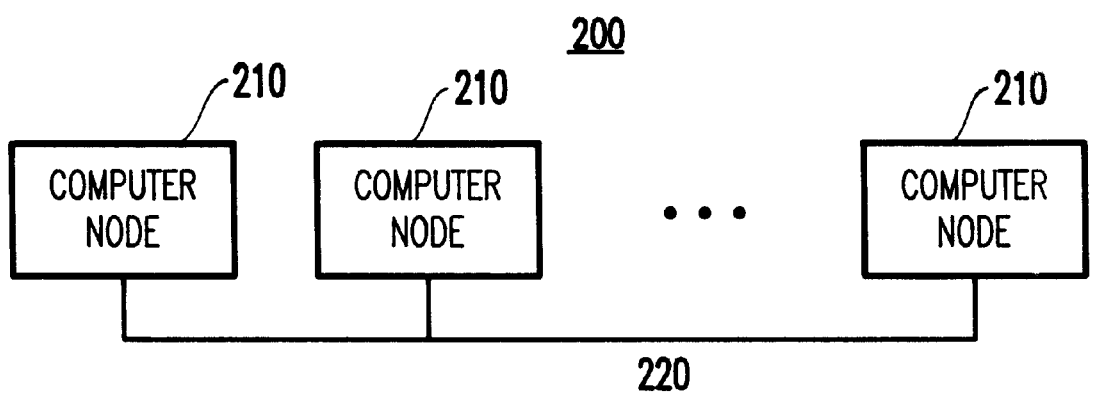
FIG. 2 is a schematic block diagram of a cluster environment.

For the purposes of the present invention (and as shown in FIG. 2), a cluster 200 can be regarded as a set of computer nodes 210, each of which contains an independent copy of the operating system, that are connected via a network 220 interconnect.

Any node 210 in the cluster 200 is capable of running the application program (e.g., a database or web serving application). The number of nodes 210 in a cluster 200 can range from two to hundreds. Hereinbelow, for ease of explanation and without loss of generality, the invention and its operation will be applied to a two-node cluster.

Typically, in a two-node cluster, one node is designated the "primary node" and normally runs the application software, and another is designated the "backup node" and is capable of running the application when the primary node fails. Distributed cluster management software running on both the primary node and the secondary node continually checks on the health of the primary node and its associated application software.

Figure 3:
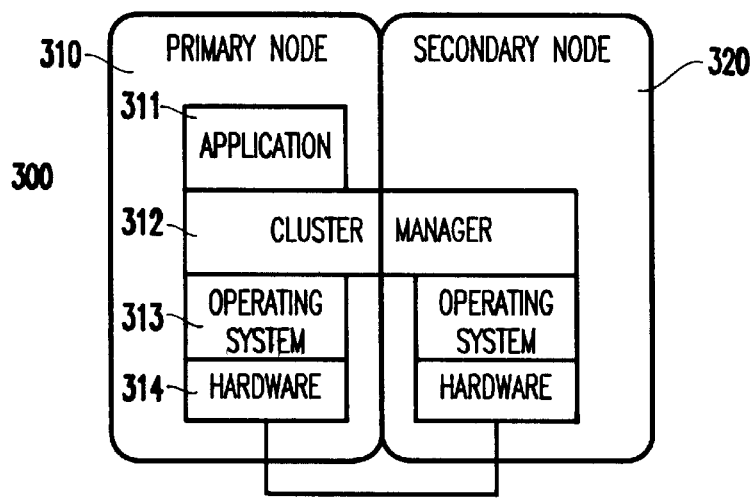
FIG. 3 illustrates software running on an industry-standard two-node cluster.
Figure 4:
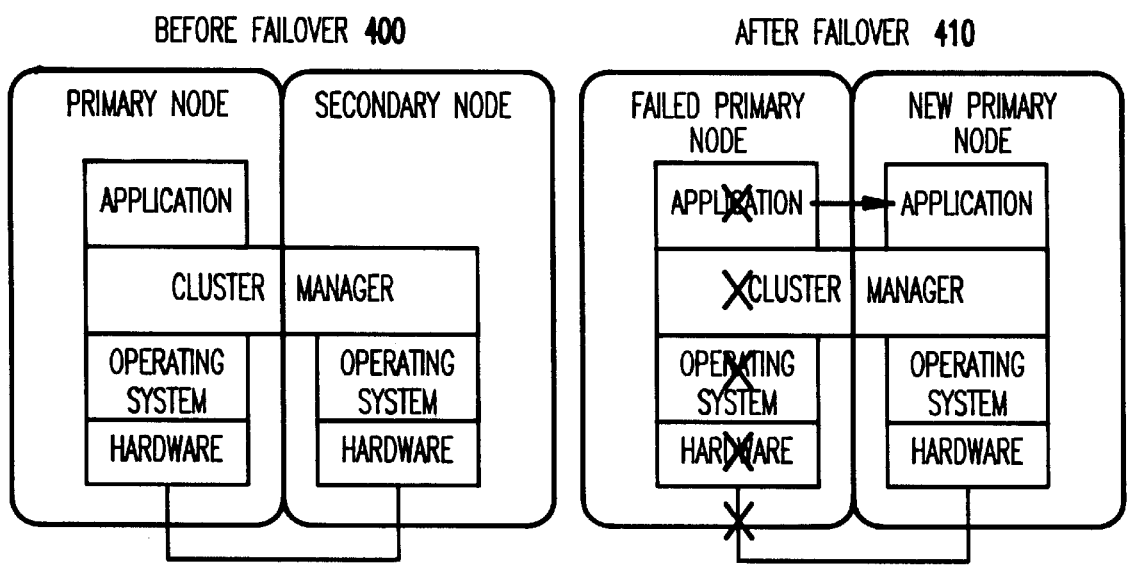
FIG. 4 illustrates failover on an industry standard two-node cluster, and more specifically cluster 400 illustrates before failover and cluster 410 illustrates after failover occurring.

As shown in FIG. 3 which illustrates software running on an industry-standard two-node cluster 300, if this cluster management software detects that any component or subsystem on the primary node 310 has failed (e.g., the application 311, middleware (not illustrated), cluster management software 312, operating system 313, or hardware 314), it causes the application to be restarted on the secondary node 320, thus providing a degree of fault tolerance. This process is called "failover," and the secondary node 320 is sometimes denoted the "fail-to" node. FIG. 4 illustrates failover on an industry standard two-node cluster. That is, cluster 400 illustrates before failover and cluster 410 illustrates after failover.

Several examples of clusters exist within the industry. For example, IBM® Corporation offers a version called HACMP® which is utilized in the IBM® AIX® operating system environment, and Microsoft® Corporation offers a version called Microsoft Cluster Server® which operates within the Microsoft Windows® NT operating system environment. The preferred embodiment of the present invention is independent of the type of the cluster environment, being equally applicable to clusters running UNIX, NT, or another operating system.

Generally, no modifications to the application source code are required for the applications to obtain the fault tolerance benefits of executing in a cluster environment. All the functionality required to detect the failure of an application or a computer node and restart the application on a secondary node resides within the cluster management software. The cluster management software exports interfaces that allow an external entity to trigger failover even when there is no fault. Transparent Symptom-Based Rejuvenation uses this interface to cause rejuvenation to occur. The cluster management software depending upon the framework used may be off-the-shelf and commercially-available such as, for example, the Netfinity Director® with special features added-on (customized) by the user.

Figure 5:
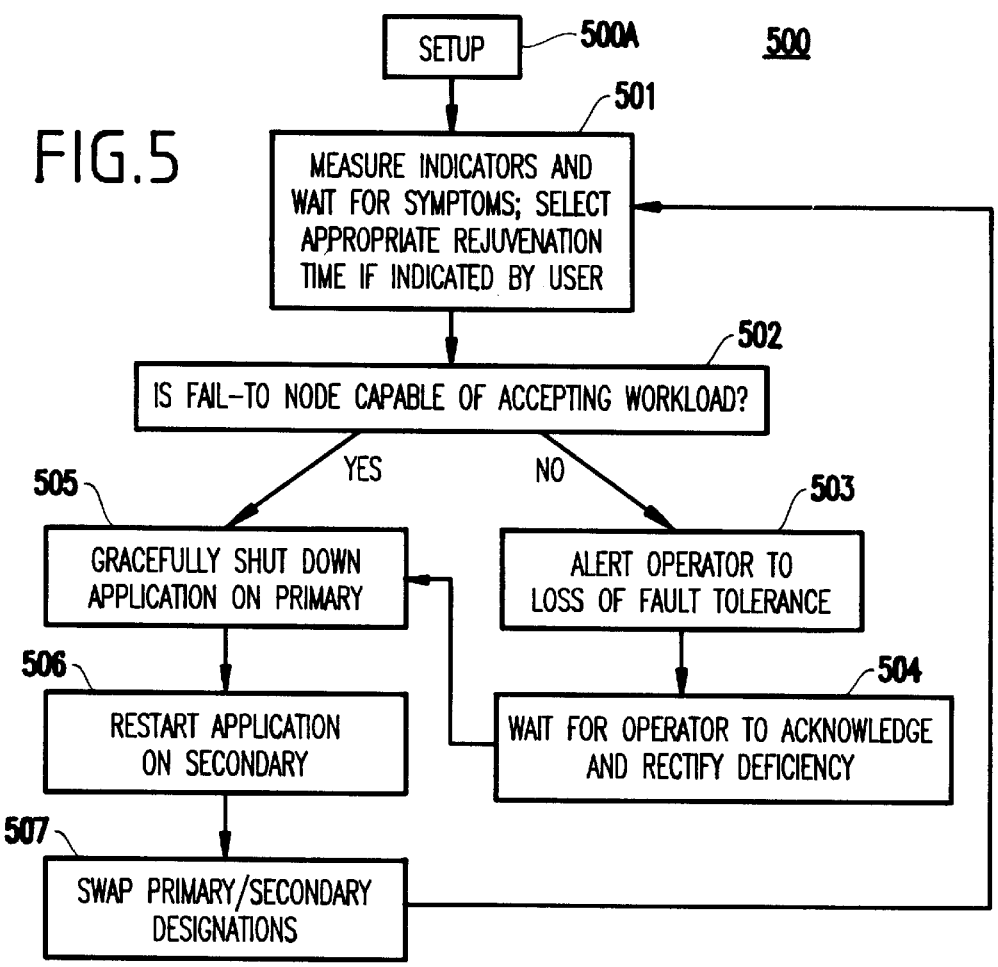
FIG. 5 illustrates a method 500 and logic flow for transparent symptom-based software rejuvenation (SSR) commencing with a preliminary setup step.

Referring to FIG. 5, the method 500 and logic flow for SSR is shown commencing with a preliminary set-up step 500A assumed to have been run. For example, the user may select parameters such as type of server-file servers, web servers, Lotus Notes servers, or parameters/variables of any custom software.

First, in step 501, the rejuvenation agent (e.g., implemented in software and discussed in further detail below with regard to the software rejuvenation system architecture) waits for symptoms and selects an appropriate rejuvenation time if indicated by the user. This step may entail "learning how to predict". That is, measuring of indicators, either singly or preferably in aggregation, may take place. In this step, the system may learn from previous outages what resource, etc. caused or tends to cause the outage.

Under normal operation, the rejuvenation agent continuously monitors a potentially large set of system parameters and logs their values to stable storage (e.g., such as a hard drive). The rejuvenation agent is capable of detecting when the system being monitored suffers an outage by, for example, examining the shutdown and restart events in the operating system's event log.

When the rejuvenation agent detects that an outage has occurred, a learning component of the rejuvenation agent analyzes the logged system parameter data just prior to the outage and identifies which of the logged parameters were near their maximum allowable values. In addition, the values of all logged parameters are recorded and designated as a region in multiparameter state space that is associated with an outage. These maximal parameter values and the state space regions thereby identified are retained during subsequent system operation after the outage, and the distance between the measured parameters and the maximal parameter values and state space regions associated with an outage is monitored as described below.

Additional outages cause this learning process to be repeated, with a resulting improvement in the accuracy of identifying causal pre-outage conditions. For example, if a certain parameter is at one value just prior to one outage of a given class, and a radically different value just prior to a second outage of that same class, then it can be concluded that it is unlikely that either value of this particular parameter is associated with the class of outages being experienced, and the parameter can therefore be removed from the list of reliable predictors.

Thus, the rejuvenation agent analyzes data and generates a prediction of imminent resource exhaustion by using one of the techniques described above. Before resource exhaustion occurs, the rejuvenation agent executes the following steps.

That is, in step 502, the rejuvenation agent determines whether the fail-to node has adequate resources to accept the failover workload (e.g., by matching the load to the available resources of the node). Such a step may be performed through interface to capacity management software. If the determination is "NO", the process continues to step 503.

In step 503, after it has been determined that the fail-to node cannot accept the failover workload, the rejuvenation agent sends an urgent alert to the operator. That is, an urgent message is sent to the system management subsystem that adequate redundancy (e.g., resources) does not exist to support fault tolerance requirements. Such is conveyed to the operator via the GUI.

Thereafter, in step 504, the rejuvenation agent suspends rejuvenation until the operator acknowledges and corrects the deficiency.

If the determination in step 502 is "YES" (e.g., if the fail-to node can accept failover workload), then in step 505, the rejuvenation agent on the primary node instructs the cluster manager to gracefully (e.g., in a planned way) shut down the application on the primary node and in step 506 to restart the application on the secondary node.

In step 507, the cluster manager designates the old secondary node as the new primary node. This step may be performed, for example, by swapping resources from node to node (e.g., such as Internet Protocol address). Thus, the old primary node serves as the new secondary node. Thereafter, the process loops to step 501 and the rejuvenation agent waits for symptoms to occur.

Figure 6:
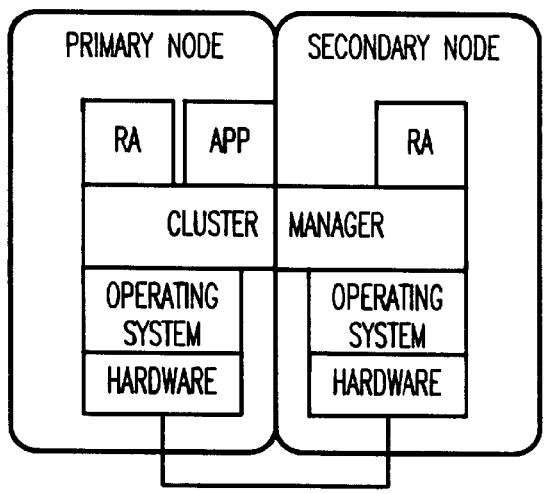
FIG. 6 illustrates a "successful" rejuvenation on an industry-standard two-node cluster, and specifically showing the cluster "before rejuvenation" 600 and the cluster "after rejuvenation" 610.
Figure 6:
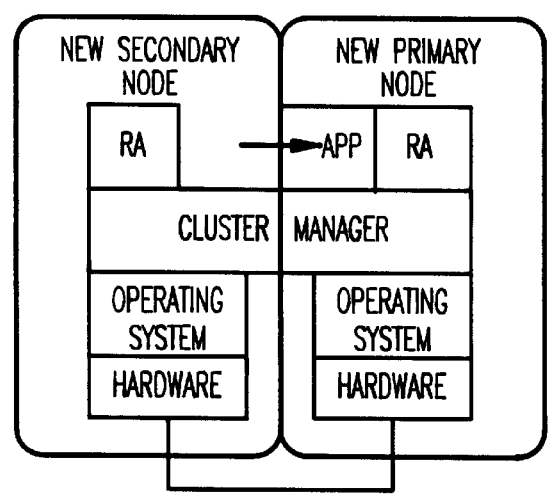

The above steps are illustrated in FIG. 6 showing a successful rejuvenation on an industry-standard two-node cluster. That is, FIG. 6 illustrates "before rejuvenation" 600 and after rejuvenation" 610.

In an embodiment of the present invention, as shown in FIGS. 7–12, transparent symptom-based selective software rejuvenation (SSR) will be described.

In SSR, a rejuvenation agent monitors the behavior of a software system seeking evidence of resource exhaustion. When potential resource exhaustion has been identified, the agent diagnoses which job (e.g., application, software subsystem, process, and/or thread; it is noted that the invention can identify problems at the granular level) is responsible for the aging, and rejuvenates that culprit (e.g., job). In the preferred embodiment, this rejuvenation is performed by the existing cluster failover mechanism. Both the monitoring and the rejuvenation are performed without requiring any modifications to the application source code.

Most operating systems provide means for monitoring system behavior. For example, Windows NT® exports an application programming interface to its Registry which allows an agent to monitor resources such as semaphores, mutexes (e.g., tokens used for shared data structure), events, non-paged pool bytes, and virtual memory. Several thousand resource instances can be monitored in the Windows® operating system in this way.

Hereinbelow are described two categories of resource exhaustion prediction. That is, prediction based on the current level of selected parameters, and prediction based on extrapolated values of parameters given a detected trend.

In parameter level-based rejuvenation, a symptom-based software rejuvenation agent uses an operating system's resource monitoring functionality to monitor a number of critical parameters, and to trigger rejuvenation when one or more of the parameters approaches an exhaustion threshold or hazardous region.

In trend-based rejuvenation, the same or similar parameters are measured, but statistical trending techniques are used to extrapolate the expected time to resource exhaustion, in order to give the system more time to rectify the problem, or to prepare for a planned or unplanned outage. Generally, regions in which it is hazardous for parameters to loiter can usually be identified either via testing, algorithms provided by the operating system vendor, or by the learning process described hereinbelow.

Level- or trend-based resource exhaustion prediction can be based on measurement of a single parameter or on multiparameter measurement.

In single parameter measurement, the RA monitors a selected set of parameters and triggers rejuvenation when at least one of them is predicted to approach a predefined resource exhaustion threshold or characteristic value. Multiparameter measurement is necessary when observation of one parameter is not adequate to predict an outage, but when multiple parameters all reach characteristic values together an outage can be expected to follow.

Single Parameter Monitoring

In single parameter monitoring, a rejuvenation agent monitors a small set of parameters and triggers rejuvenation when one or more of them approaches a predefined resource exhaustion threshold or characteristic hazardous value. This is effective for scenarios where a small number of primary indicators are found which reliably indicate resource exhaustion.

Figure 7:
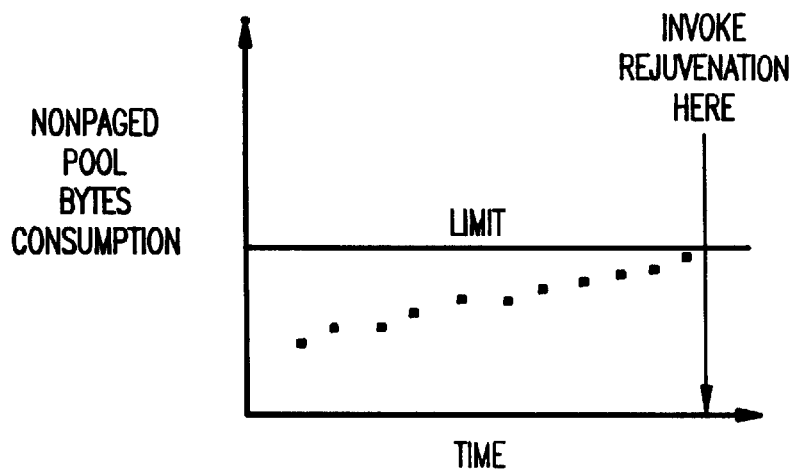
FIG. 7 illustrates the growth in consumption over time of a typical resource (e.g., non-paged pool bytes) towards an upper limit, and in which a rejuvenation agent can invoke rejuvenation at a time when the parameter approaches this limit.

The parameters that are worth monitoring and the pre-outage values of these parameters are "remembered" (e.g., by the system) from outage to outage. FIG. 7 illustrates, for example, the growth in consumption over time of a typical resource (e.g., non-paged pool bytes), towards an upper limit. An agent can invoke rejuvenation at a time when the parameter approaches this limit.

Integral Test

In some cases, a critical resource cannot always be monitored directly. For example, certain parameters cannot be measured on a per process basis (e.g., mutexes). However, if such parameters (e.g., mutexes) must be measured and if, for example, a mutex is needed to open a file, a number of "file opens" can be measured as an indirect measure of the number of mutexes that are taken out.

Therefore, two categories of parameters are considered. That is, primary indicators and secondary indicators are considered.

Primary indicators provide a direct measure of the consumed resource, and thus they can be directly monitored for resource exhaustion. An example of a primary indicator is non-paged pool bytes. When this resource (e.g., non-paged pool bytes) becomes consumed, an unplanned system outage is likely.

Secondary indicators measure activities which consume resources. These resource-consuming activities themselves do not approach threshold values because they do not directly measure resource consumption. However, as they are performed, untrammeled resource consumption occurs.

An example of a secondary indicator is the number of times a particular buggy system call is invoked that allocates memory. If there is a memory leak in this system call (i.e., a malloc ( ) not eventually followed by a free ( )), then the number of such system calls that have occurred over time can indirectly indicate the unbounded consumption of memory resources.

For these situations, the "integral test" has been defined by the present invention. In the integral test, the system monitors a selected set of parameters and triggers rejuvenation when the time-integral of one or more of them approaches a level correlated with resource exhaustion.

Parameter Variance

In this technique, one can monitor one or more parameters and analyze how much each parameter varies from a running average value of that parameter. A significant increase or decrease in variance can be correlated with an outage. For example, a system or process "hang" is typified by a cessation of activity, such as network traffic, CPU utilization, or paging. Such hangs may occur due to resource exhaustion, coding errors leading to deadlock, or other causes. The relevant activity can be monitored by a rejuvenation agent and, if it is seen to be gradually decreasing, an impending hang can be predicted.

In some cases, cessation of activity indicated by a single parameter is inadequate to indicate a hang, and multiple parameters must be observed to quiesce concurrently before a hang can be reliably predicted. For example, it may be normal for paging traffic to quiesce, but if paging traffic quiesces and CPU utilization falls to zero, a hang may be indicated.

Multiple Parameter Monitoring

While single-parameter tests may be adequate in some scenarios, in other cases more sophisticated interpretation and analysis of the data is necessary in order to accurately predict outages. For example, some system outages are characterized by not just one parameter reaching an extreme value, but by several values in concert reaching a characteristic region, in which value(s) may not necessarily achieve a global extreme. In these cases, single-parameter extremum monitoring is ineffective and a composite approach is necessary.

In the multiparameter technique, outages are correlated with states in which K watch parameter values reside in characteristic regions in K-dimensional state space (e.g., where K is a positive integer). In this case, observation of one watch parameter is not adequate to predict an outage, but when multiple watch parameters all reach characteristic values, an outage can be predicted to follow with a high probability. A characteristic pre-outage region of N-dimensional space is called a "danger cluster." When the K-dimensional state vector approaches within a certain distance of the danger cluster, an impending outage is signaled and rejuvenation is invoked. It is noted that, in the danger cluster, not all watch parameters are necessarily at a global extreme.

Figure 8:
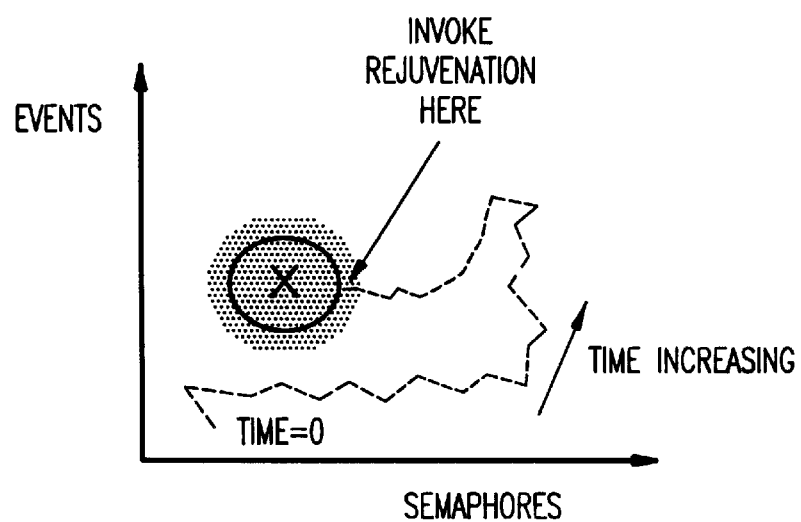
FIG. 8 illustrates two parameters (e.g., events and semaphores), each of which varies over time, and a time at which rejuvenation should be invoked (e.g., a region X of this two-dimensional parameter space known to be associated with outages.

For example, FIG. 8 illustrates two parameters (e.g., events and semaphores), each of which varies over time. It is supposed that a region of this two-dimensional parameter space is known to be associated with outages (e.g., region X in FIG. 8).

It is noted that region X does not correspond to an extreme value of semaphores, nor is an extreme value of the events parameter associated with an outage unless the semaphore value is within region X. As the two parameters wander through this two-dimensional space over time, they may eventually approach region X. At some point of closest approach, rejuvenation can be invoked.

The advantages of the general multiparameter technique include that it is completely general in terms of the number of watch parameters needed to predict an outage, and it does not rely on the assumption that any given watch parameter is at a global extreme just prior to an outage.

Euclidean Distance Calculation

Figure 9:
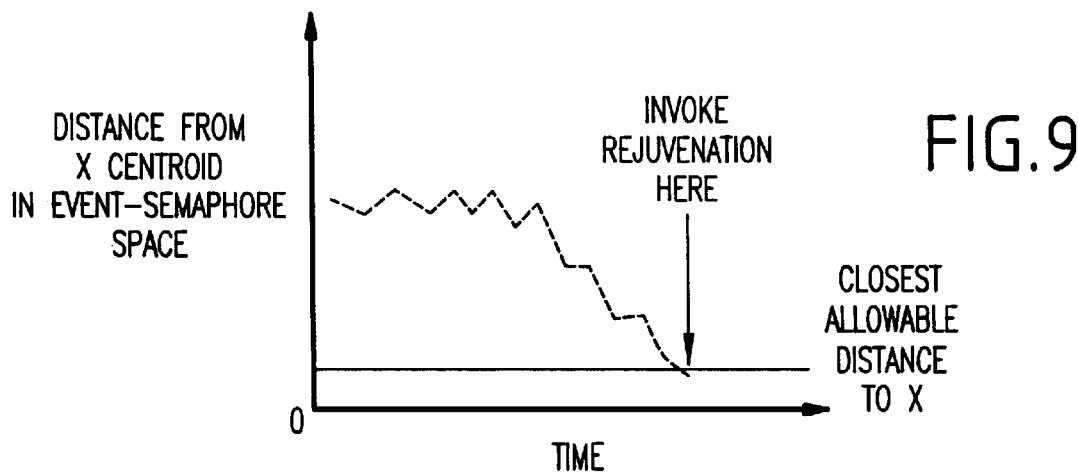
FIG. 9 illustrates a method of analyzing resources consumed in a multiparameter space by calculating the Euclidean distance in two-dimensional space between the parameter samples at any point in time and the centroid of region X.

Another way to analyze the resources consumed in a multiparameter space is to calculate the Euclidean distance in two-dimensional space between the parameter samples at any point in time and the centroid of region X, as shown in FIG. 9. The distance $D_i$ of event and semaphore sample at time i ($E_i$, $S_i$) from the centroid of region X in parameter space, denoted ($EX$, $SX$), can be calculated as:

$$D_i = sqrt((E_i - EX)^2 + (S_i - SX)^2)$$

When the parameter space is K-dimensional (as is typical), the calculation is generalized to $$Di = sqrt(\text{sum over } i(Pi-PX)^2))$$

where Pi indicates the value of parameter P at time i, and PX is the value of parameter of P at the centroid of region X.

Figure 10:
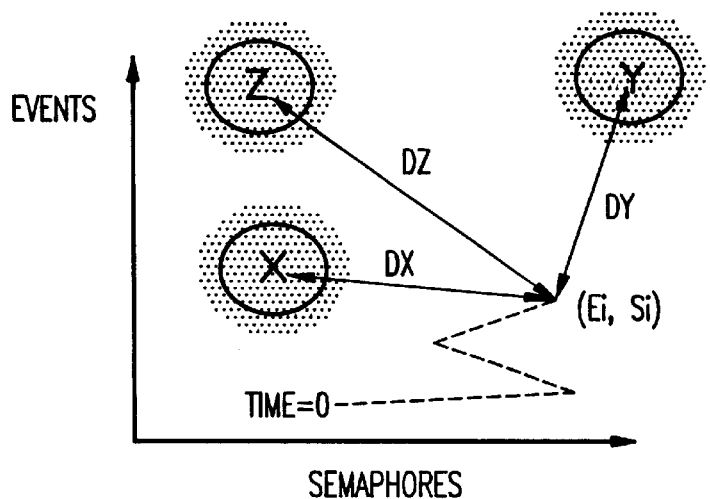
FIG. 10 illustrates that there will be several modes of resource exhaustion that can be experienced by a given system, and that each one will be represented by different "danger clusters" (e.g., regions X, Y, and Z)

It is possible that there will be several modes of resource exhaustion that can be experienced by a given system, and that each one will be represented by different "danger clusters" (e.g., regions X, Y, and Z in FIG. 10). In this case, it is necessary to calculate the distance between the current sample in parameter space and the centroid of each danger cluster, and invoke rejuvenation when any cluster is approached.

Trend Analysis

In a trend test, the system monitors a selected set of watch parameters, performs trend detection via standard statistical techniques, and identifies trends in parameter values or integrated parameter values that indicate that the system is approaching a resource exhaustion state.

Figure 11:
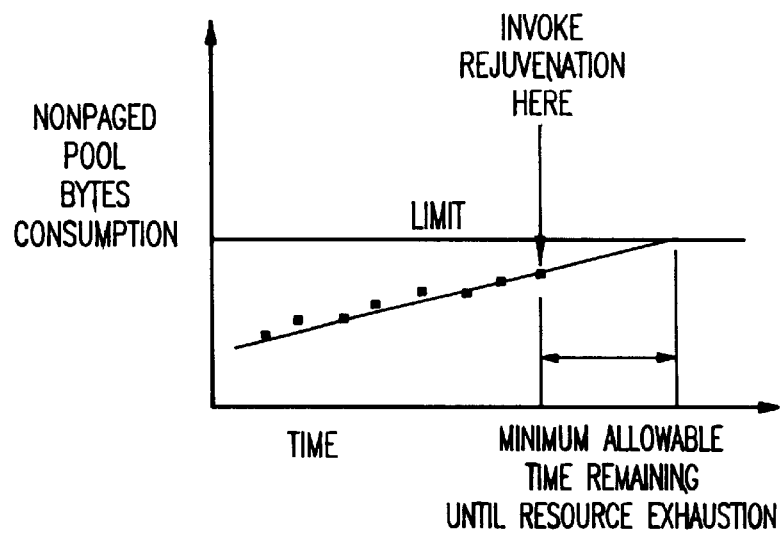
FIG. 11 illustrates a linear trend line fitted to the consumption of a resource (e.g., non-paged pool bytes)

In this case, when one can identify the resource exhaustion threshold, the current level of the resource, and the rate of exhaustion per unit time, one can estimate the time to resource exhaustion. FIG. 11 illustrates a linear trend line fitted to the consumption of non-paged pool bytes. The trend line is extrapolated to the parameter limit, and the time from the last sample to resource exhaustion may be calculated. If this time is less than some time deemed "comfortable" by the system operator, then rejuvenation is scheduled at the earliest convenient opportunity.

Trend of Distance from Danger Cluster

Figure 12:
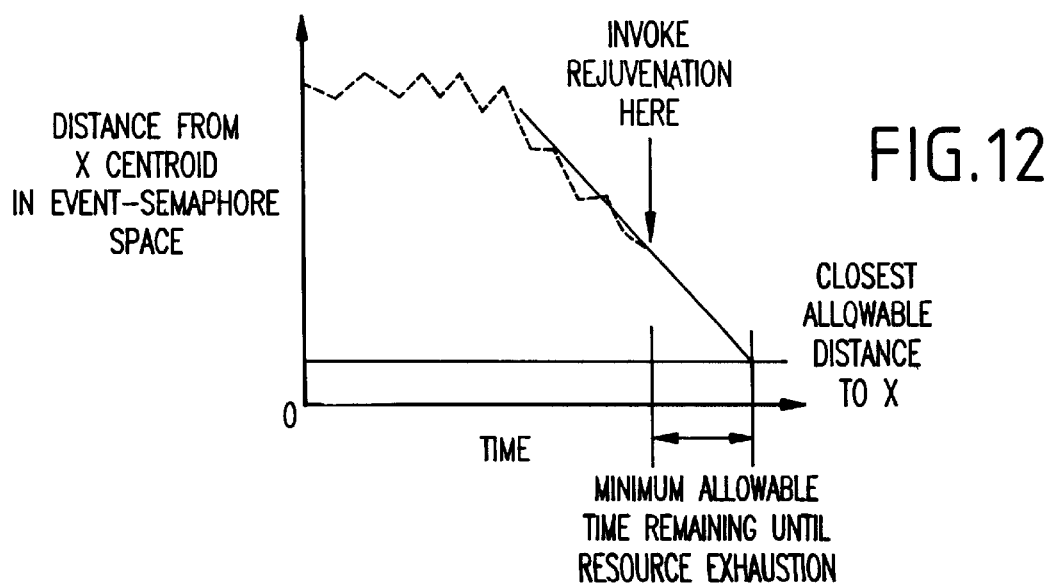
FIG. 12 illustrates measuring a trend by measuring a distance from a danger cluster.

Optionally, as shown in FIG. 12, the rate of approach to each danger cluster can be measured, and the time to outage can be predicted as the minimum time to approach each danger cluster. That is, the danger cluster having the shortest minimum time would all that would have to be taken into account, since at this "shortest minimum time" the outage would occur.

Trend of Parameter Variance

When a high degree of parameter variance can be correlated with an outage, the variance can be monitored over time and its trend can be measured. When the variance threshold and rate of change can be defined, one can predict the length of time until the outage.

Trending Algorithms

A simple non-parametric trend detection and estimation technique called "the Sen's slope estimate" can be applied to the parameter data to detect a linear trend over time. The procedure for computing the slope estimate (linear trend) is as follows.

First, the slope is computed for every pair of data points d(i) and d(j) as (d(j)−d(i))/(j−i), such that d(i) precedes d(j) in time, or in other words, time j is greater than time i. The trend estimate for the entire data set is the median of all these slopes.

Then this trend is extrapolated to estimate the time to resource exhaustion. If the estimated time to exhaustion is less than the minimum allowable time before exhaustion (e.g., as defined by the operator), rejuvenation is scheduled. A pessimistic and an optimistic time, respectively, to resource exhaustion is also obtained by projecting the trend from the maximum and the minimum values of the monitored parameter.

To eliminate undue effects on the estimates due to outliers, the 95th percentile and the 5th percentile of the parameter values respectively, are substituted in place of the maximum and the minimum values.

When the actual data has a variance about the trend line, it is necessary to add or subtract the variance from the projected trend line to predict with a given probability when the trend plus or minus its variance will exceed a threshold.

Instead of taking the median of all slopes as done in the Sen's slope estimate procedure, simple averaged or weighted averaged slopes, or average m slopes around the median is taken as the estimates to obtain stable estimates.

Periodic effects in the parameter data is handled in one of two ways. That is, either the periodic components are filtered out or they are incorporated into the prediction analysis.

Some parameters under certain conditions may exhibit nonlinear trends which cannot be estimated by linear trend estimates reasonably well. In such cases, nonlinear trend techniques like quadratic fitting and other polynomial fittings are done to obtain more accurate estimates.

Learning Algorithm

The appropriate analytical procedures, parameters to model, danger clusters, and limits for a given system generally depend quite strongly on the operating system, application, and workload. Therefore, a learning procedure must be used to allow a given system to automatically characterize its own outages and select the best analytical procedure. The applicable analytical procedure is identified online, by having a system observe its own outages and select the best outage prediction technique.

Under normal operation, the rejuvenation agent continuously monitors a potentially large set of system parameters and logs their values to stable storage, e.g., on a hard drive. The rejuvenation agent is capable of detecting when the system being monitored suffers an outage by, for example, examining the shutdown and restart events in the operating system's event log. When the rejuvenation agent detects that an outage has occurred, a learning component of the rejuvenation agent analyzes the logged system parameter data just prior to the outage and identifies which of the logged parameters were near their maximum allowable values.

In addition, the values of all logged parameters are recorded and designated as a region in multiparameter state space that is associated with an outage. These maximal parameter values and the state space regions thereby identified are retained during subsequent system operation after the outage, and the distance between the measured parameters and the maximal parameter values and state space regions associated with an outage is monitored as described below.

Additional outages cause this learning process to be repeated, with a resulting improvement in the accuracy of identifying causal pre-outage conditions. For example, if a certain parameter is at one value just prior to one outage of a given class, and a radically different value just prior to a second outage of that same class, then it can be concluded that it is unlikely that either value of this particular parameter is associated with the class of outages being experienced, and the parameter can therefore be removed from the list of reliable predictors. This functionality is not depicted separately in the Figures, and currently resides in the "Trend Analysis and Forecasting" section of the Xtalk module 1303 described below.

Diagnosis

Once a high level of resource consumption has been detected, it is a relatively simple matter to measure how much of that resource is being consumed by each job (e.g., application, process, and/or thread, down to the granular level). In most cases, the job that is consuming the most resources is the one that contains a resource leak and is therefore a good first candidate for selective rejuvenation.

For example, when the rejuvenation agent detects that a system-level resource such as non-paged pool bytes is approaching exhaustion, it interrogates the performance data exported by the operating system and determines how much of this or a related resource is being consumed by each process or job object.

Figure 13:
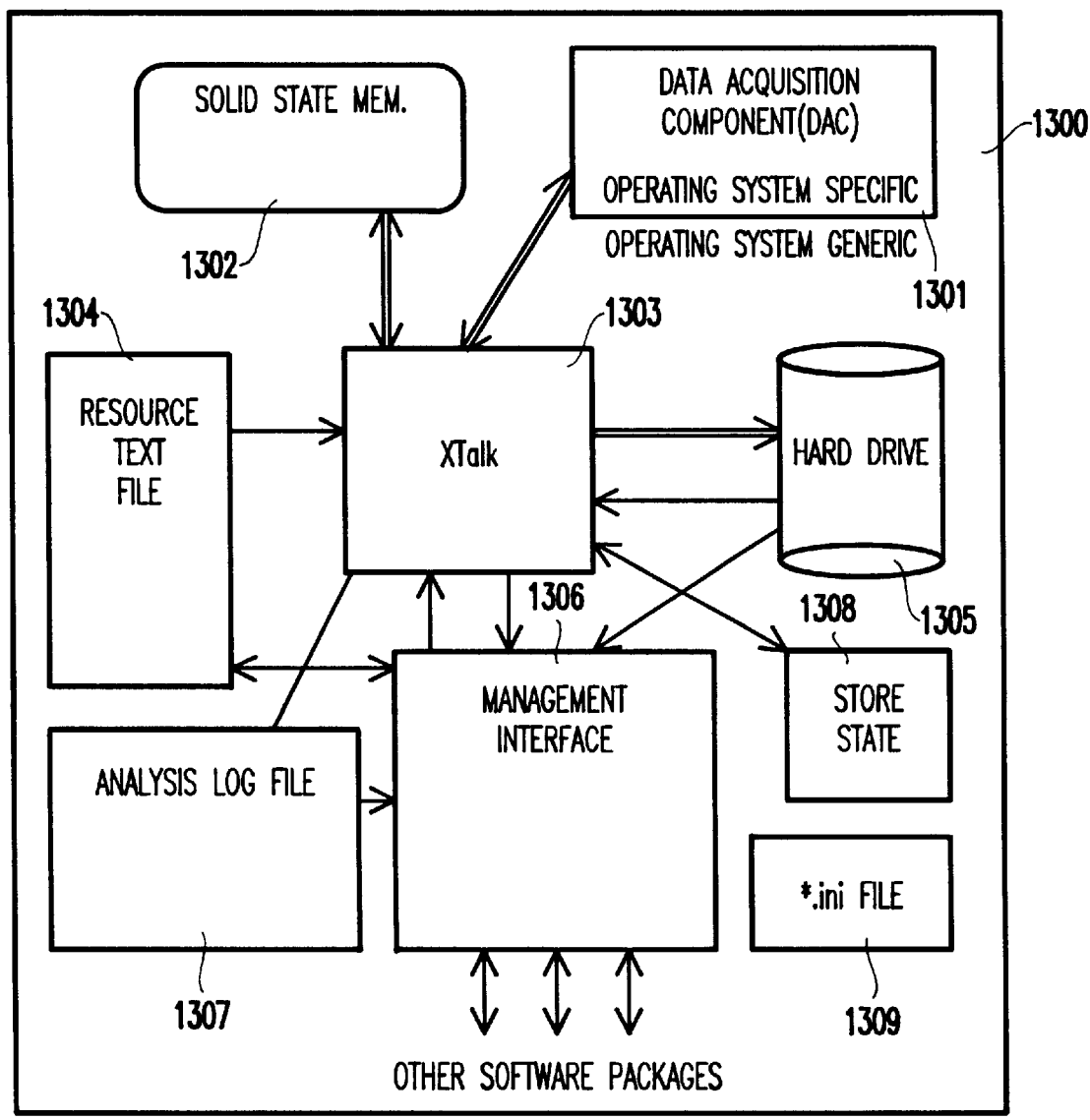
FIG. 13 is a schematic diagram showing a preferred architecture for a software rejuvenation system 1300 according to the present invention.

FIG. 13 illustrates an exemplary architecture for the software rejuvenation system 1300 according to the present invention. The system 1300 includes a data acquisition component (DAC) 1301 which is preferably operating system specific, a memory device (e.g., solid state memory) 1302 for storing raw data, an XTALK module 1303 for performing a trend analysis and forecasting based on inputs from the memory 1302 and DAC 1301 and other components described below, a resource text file 1304 coupled to the XTalk module 1303 which includes parameters to be monitored and parameter log configuration, a hard drive 1305 coupled to the XTalk module 1303 for storing raw data and binary files, a management interface 1306 for performing overall software package control, configuration and monitoring (and which is for interfacing with other software packages), an analysis log file 1307 for storing a verbatim history of forecasts, a store state 1308 coupled to the XTalk module 1303 for serving as a "scratch pad" for the system, and an *.ini file 1308 which contains the names of the various files used by Software Rejuvenation suite of software. These files include the Resource File, the Analysis Log File, the Raw Data File, the Store State File, and the host name of the machine being monitored by this instantiation of the rejuvenation agent. By using user-defined names, different suites of software running simultaneously will not overwrite each other data and the user can configure the names to corporate naming convention. It is initialized by the management interface 1306.

Figure 14:
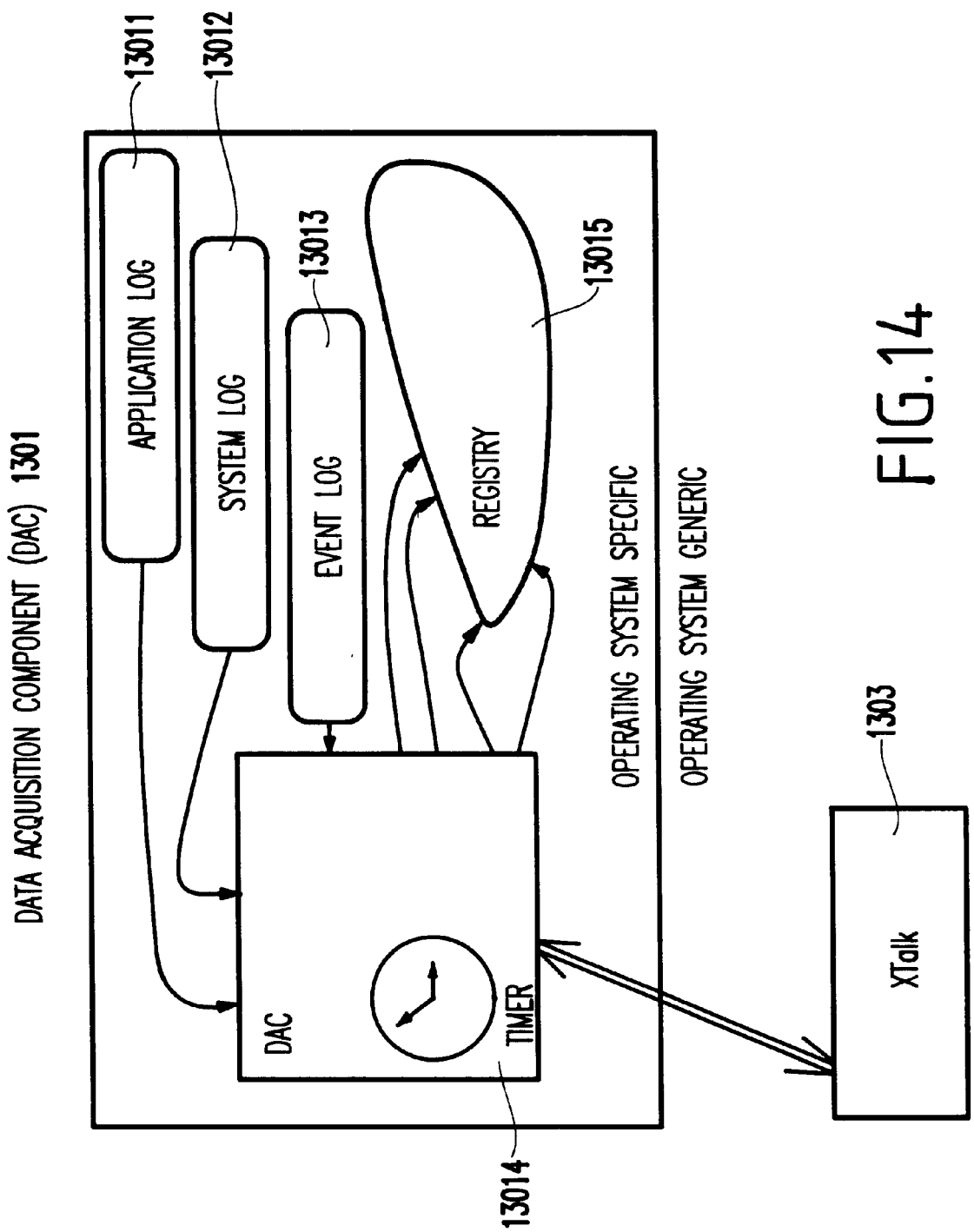
FIG. 14 schematically illustrates a data ac acquisition component (DAC) 1301 for the software rejuvenation system 1300 shown in FIG. 13 according to the present invention.

Turning now to some of the constituent modules of system 1300 and specifically to FIG. 14, the Data Acquisition Component (DAC) 1301 gathers information from the Operating System and sends it to the XTALK module 1303. It can also be configured to pull data from Event Logs 13011, System Logs 13012, and/or Application Logs 13013. Since this module 1301 polls the data directly from the Operating System, it is Operating System specific. The remaining portion of the Software Rejuvenation is designed to be Operating System generic for maximum flexibility. The DAC also includes a timer 13014 which indicates how often to acquire data from the Operating System data sources, and, for Windows NT® systems, an interface with the Registry 13015, a data structure that contains many of the performance parameters to be monitored for resource exhaustion. Other operating systems provide equivalent sources for this data.

Figure 15:
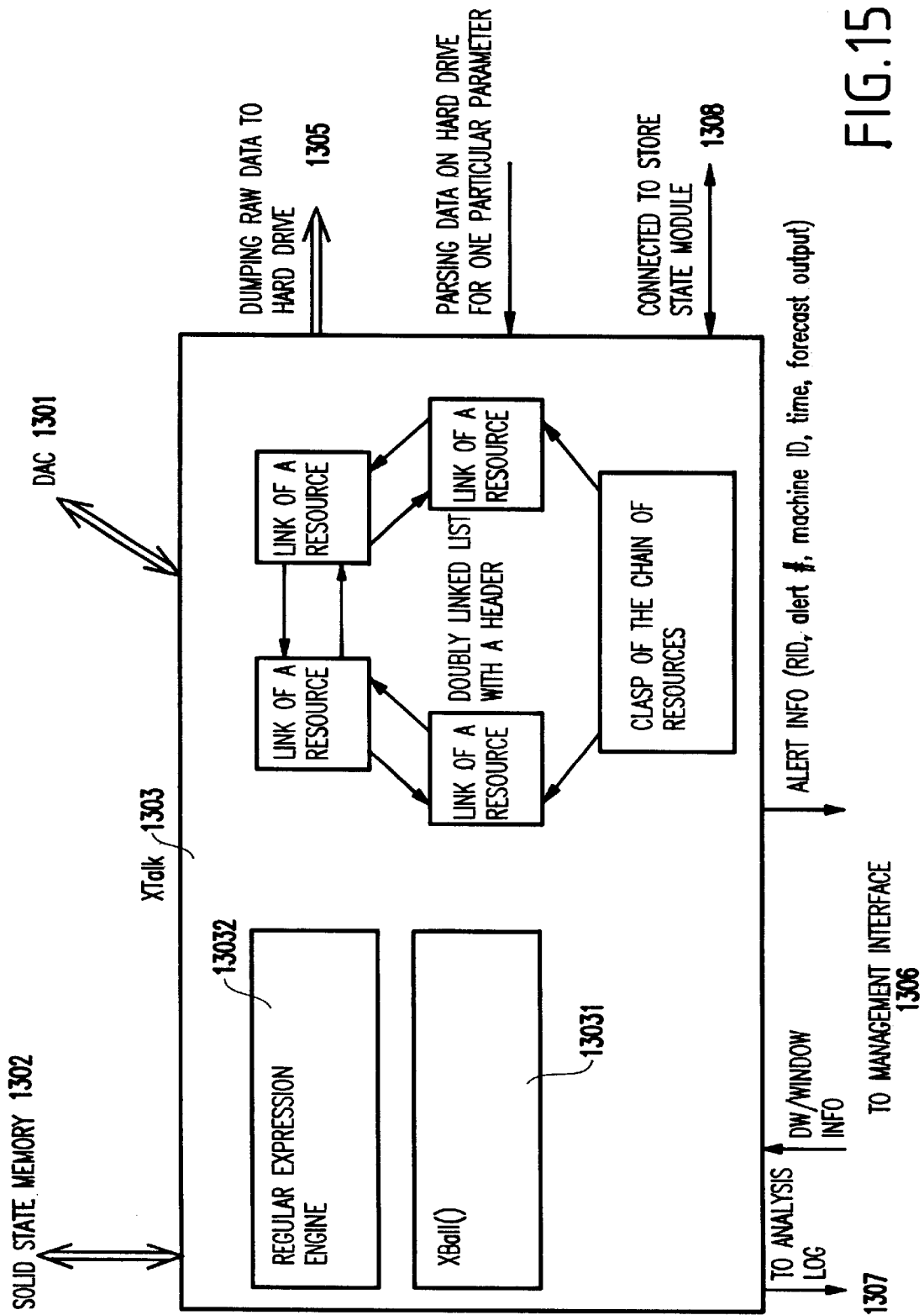
FIG. 15 schematically illustrates an XTalk component 1303 of the software rejuvenation system 1300 shown in FIG. 13 according to the present invention.

The XTALK module 1303 performs data analysis, forecasts trends and initiates events in response to these trends. As shown in FIG. 15, XBall 13031 performs the data analysis and trend extraction from the information gathered from the DAC 1301. A forecast on software exhaustion is then made based upon these trends. The Regular Expression Engine 13032 combines trends and parameters into logic expressions to provide arbitrary flexibility in combining analytical techniques and parameter values into a reliable aggregate predictor of impending outage, and responding to these predictions in a customizable way. These logical expressions program XTALK 1303 to issue alerts to the Management Interface 1306. Furthermore, XTALK 1303 passes the raw data gathered from the DAC 1301 to the hard drive 1305 for permanent storage. The Chain of Resources (unreferenced) is a simple circular linked list that contains descriptors of the parameters that are to be monitored for resource exhaustion. It resides in memory for speed of access. Each element (link) on the list contains the name of the resource to be monitored, its limit values, and other information that facilitates the analysis. Links are added and deleted to the Chain as predictive parameters are discovered or discarded. The Clasp is simply the head, or starting point, of the Chain. Forecast outputs are stored in the analysis log 1307 for permanent archival, as well.

Figure 16:
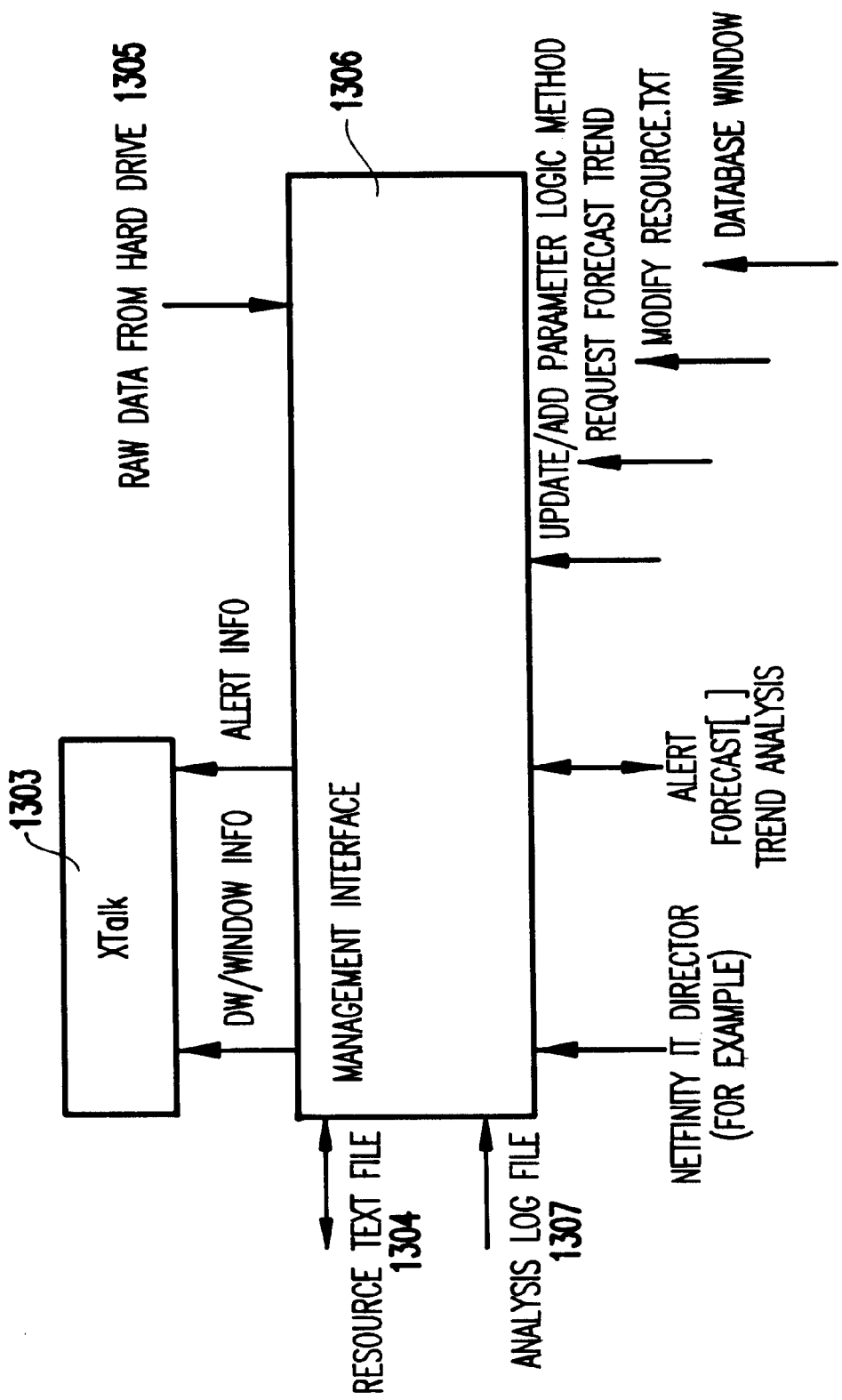
FIG. 16 schematically illustrates a management interface 1306 for the software rejuvenation system 1300 shown in FIG. 13 according to the present invention.

Referring to FIG. 16, the Management Interface 1306 controls and configures the Software Rejuvenation suite of software. It can examine current and historical data. All archival logs can be queried from this point. It is also the interface for all other software packages in the Operating System. Agents from other packages can examine data or modify configuration files from interface 1306. Alerts are passed through the Management Interface 1306 to the intended recipient running in the Operating System or Internet.

Figure 17A:
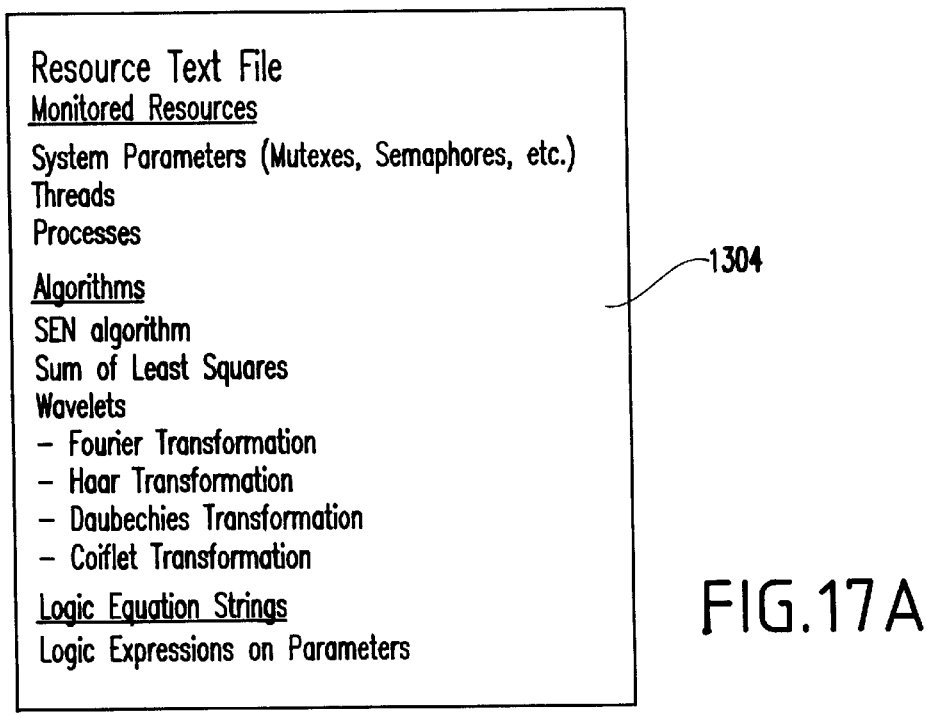
FIGS. 17A–17D respectively show a Resource Text File 1304, an Analysis Log file 1307, a Store State 1308, and a *.ini file 1309 for the software rejuvenation system 1300 shown in FIG. 13 according to the present invention.

As shown in FIG. 17A, the resource text file 1304 holds the parameters to be monitored by the Software Rejuvenation software. Trend analysis and forecasts will be performed on these and only these parameters listed. The resources may be general to the Operating System or specific to an application. All resources may be associated with one process may be monitored and this can be accommodated, as well. In addition to listing the target resources, the data analysis algorithms can be specified. These algorithms extract trends and eliminate noise from the raw data. These algorithms can be specified by the user. Lastly, logic expressions composed from resources can be made. Groups of resources can be combined in logic expressions to initiate alerts and/or corrective actions for specific conditions. The string for the logic expressions are stored in the Resource text file 1304.

The Regular Expression Engine 13032 (e.g., see FIG. 15) in the XTALK module 1303 interprets the strings and responds appropriately from them. Monitored parameters, analytical techniques, and regular expression strings can freely added and selected by the system operator via a user interface. Alternatively, an application software vendor or other party can select the optimal parameters, algorithms, and strings for monitoring a given application or application class based on experience with that application, and provide this file to the customer along with the application. Finally, the learning subsystem can update the contents of this file (as well as the Chain of Resources) as it identifies outage precursors as described above.

Figure 17B:
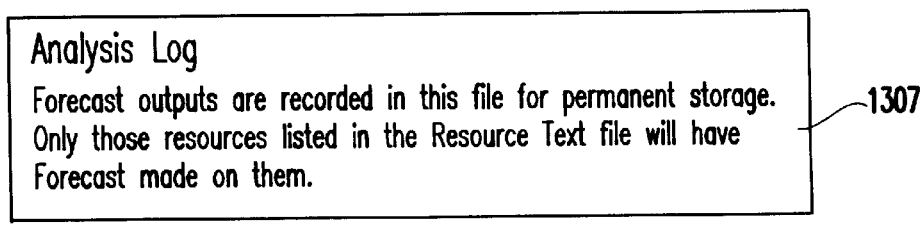

As shown in FIG. 17B, the Analysis log file 1307 simply stores the forecast output in a permanent form for future inspection. Only those resources listed in the Resource Text File 1304 will be analyzed and forecasts made upon. Then, only those resources will have forecast outputs in the Analysis Log file 1307. All alerts are recorded here, as well.

Figure 17C:
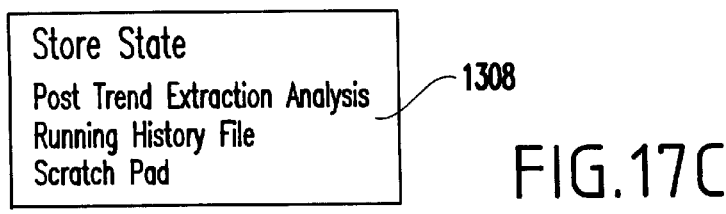

As shown in FIG. 17C, the store state 1308 facilitates low level post trend extraction analysis to investigate at a deeper level the existence of incipient faults. The running history of the Software Rejuvenation suite of software is stored in this file. In addition to all of this, the store state 1308 also stores miscellaneous information, such as, for example historical data and candidate prediction techniques needed for the learning subsystem.

Figure 17D:
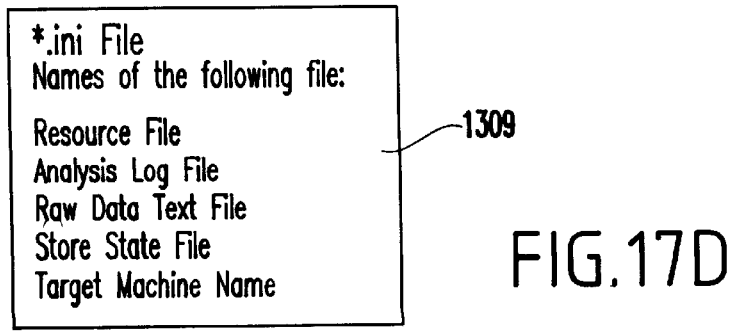

As shown in FIG. 17D, the *.ini file 1309 contains the names of the various files used by the Software Rejuvenation suite of software. By using user-defined names, different suites of software running simultaneously will not overwrite each other data and the user can configure the names to corporate naming convention and the like.

FIG. 18 illustrates a typical hardware configuration of an information handling/computer system in accordance with the invention and which preferably has at least one processor or central processing unit (CPU) 1811.

The CPUs 1811 are interconnected via a system bus 1812 to a random access memory (RAM) 1814, read-only memory (ROM) 1816, input/output (I/O) adapter 1818 (for connecting peripheral devices such as disk units 1821 and tape drives 1840 to the bus 1812), user interface adapter 1822 (for connecting a keyboard 1824, mouse 1826, speaker 1828, microphone 1832, and/or other user interface device to the bus 1812), a communication adapter 1834 for connecting an information handling system to a data processing network, the Internet, an Intranet, a personal area network (PAN), etc., and a display adapter 1836 for connecting the bus 1812 to a display device 1838 and/or printer 1839. As mentioned above, the printer 1839 may be a digital printer or the like.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Thus, as shown in FIG. 19 in addition to the hardware and process environment described above, a different aspect of the invention includes a computer-implemented method according to the present invention, as described above. As an example, this method may be implemented in the particular hardware environment discussed above.

Such a method may be implemented, for example, by operating the CPU 1811 (FIG. 18), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1811 and hardware above, to perform the method of the invention.

This signal-bearing media may include, for example, a RAM contained within the CPU 1811, as represented by the fast-access storage for example. Alternatively, the instructions may be contained in another signal-bearing media, such as a magnetic data storage diskette 1900 (FIG. 19), directly or indirectly accessible by the CPU 1811.

Whether contained in the diskette 1900, the computer/CPU 1811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, Transparent Software Rejuvenation (TSR), according to the present invention, allows a system operator to cause selective software rejuvenation to be performed automatically, on a periodic basis, without operator intervention, and at a time which is least disruptive to system operation. The "time" may be gauged by a calendar provided to the user through a graphical user interface (GUI). "Least disruptive" may be determined dynamically or user-selected. The rejuvenation may be based on the time elapsed since the last rejuvenation, or it may be based on having completed a particular workload, such as a certain number of batch jobs.

Transparent Software Rejuvenation may be set up within the operator's normal system management console, where the operator may select rejuvenation of all or part of the system.

Transparent Software Rejuvenation is transparent to the application program. That is, no changes to the application software are required to obtain the benefits of TSR. When software rejuvenation is invoked within a cluster environment, the cluster management failover services (i.e., Microsoft® Cluster Services or HACMP) may be used to "gracefully" stop the offending subsystem and restart it on the same or another node in the cluster, in a controlled manner. For purposes of the present application, "gracefully stopping" means terminating a program or operation in a pre-planned, purposeful manner such as closing out files properly and without any effect to any other subsystem or system performance.

Prior to invoking rejuvenation in the cluster case, TSR checks the "fail-to" node of the cluster to confirm that it has adequate resources (e.g., processor instruction execution throughput capacity, I/O bandwidth capacity, memory storage capacity, disk storage capacity, etc.) to accept the failed-over workload.

If the resource check fails, TSR informs the system operator that the failover cannot occur, alerting the operator of the system's inability to perform rejuvenation and, perhaps more significantly, its inability to tolerate an unplanned failure of the system to be rejuvenated.

Then, the operator can take corrective action to restore the system's fault resilience by performing actions such as adding processors, adding memory, adding I/O devices, adding storage, or perhaps rejuvenating the fail-to node in an attempt to free up resources consumed by aging on the fail-to node itself.

With the unique and unobvious aspects of the present invention, unplanned outages due to resource exhaustion are avoided by periodically rejuvenating the software system. This benefit is provided transparently to the application software.

Rejuvenation can increase a system's mean-time-to-outage by a factor of two or more (e.g., based on an analytical model), depending on the degree of aging. Once it has been set up, the rejuvenation process is completely automated and therefore not susceptible to human error, either in terms of forgetting to perform the rejuvenation, or in terms of errors in performing the rejuvenation itself.

Additionally, symptom-based rejuvenation could be employed with time-based rejuvenation such that rejuvenation can be scheduled to occur at a time of least system workload, when an operator may not be present. Selective rejuvenation allows the operator to only rejuvenate that part of the system that is the cause of the aging, further reducing any impact on system operation. Because transparent rejuvenation requires no modifications to the application software, it can be used for any application running on the system, without modification.

Because the present invention can use the fail-over capabilities of a clustered system, very little downtime is incurred to perform the rejuvenation. Finally, the invention provides an automatic and continual check on the system's capability to tolerate an unplanned failure.

While a preferred embodiment of the present invention has been described above, it should be understood that it has been provided as an example only. Thus, those skilled in the art will recognize that the invention can be practiced with modification within the spirit and scope of the appended claims.

Having thus described our invention, what we claim as new and desire to secure by Letters Patent is as follows:

1. A method for increased software dependability, comprising:
   learning how to predict an outage of a software system running on a computer;
   based on said learning, predicting an imminent outage;
   avoiding the outage; and
   rejuvenating said software without modifying an application running in said software system.

2. The method according to claim 1, wherein said learning includes measuring at least one parameter indicative of said outage.

3. The method according to claim 2, wherein said measuring is performed one of directly and indirectly.

4. The method according to claim 1, wherein said learning comprises monitoring at least one of system parameters, resources, and events prior to a previous outage to determine which of said at least one of parameters, resources, and events and their values constitute a reliable predictor of said outage.

5. The method according to claim 1, wherein said avoiding said outage comprises notifying an operator of said computer of said predicted imminent outage.

6. The method according to claim 1, wherein said avoiding said outage comprises automatically rejuvenating at least one of said system, a subsystem of said system, and a thread in said subsystem.

7. The method according to claim 1, further comprising:
   selectively rejuvenating said system such that only that part of the system that is causing aging is rejuvenated.

8. The method according to claim 1, wherein an aggregation of indicators is performed during said learning to provide a reliable predictor of impending outage.

9. A method for software rejuvenation, comprising:
   waiting for symptoms associated with an imminent outage of software of a software system;
   determining whether a fail-to node has adequate resources to accept a failover workload;
   if said determining determines that the fail-to node cannot accept the failover workload, sending an alert that adequate resources do not exist to support fault tolerance requirements;
   suspending rejuvenation until an operator acknowledges and corrects a deficiency; and
   rejuvenating said software without modifying an application running in said software system.

10. The method according to claim 9, further comprising:
    if the determining determines that the fail-to node can accept the failover workload, then a rejuvenation agent on a first node instructing a cluster manager to shut down an open application in a pre-planned manner on the first node; and
    restarting the application on a second node.

11. The method according to claim 9, further comprising:
    if the determining determines that the fail-to node can accept the failover workload, then a rejuvenation agent on a node instructing a cluster manager to shut down an open application in a pre-planned manner on the node; and
    restarting the application on the node.

12. The method according to claim 10, wherein said first node comprises a primary node and said second node comprises a secondary node, said method further comprising:
    designating, by the cluster manager, the secondary node as a new primary node, and the primary node as a new secondary node.

13. The method according to claim 9, wherein said rejuvenation is performed in one of a clustered environment and a single node environment.

14. The method according to claim 9, wherein said rejuvenation is devoid of changing any of a source code and an executable code of an application running on said system.

15. The method according to claim 9, further comprising:
    predicting an impending outage due to resource exhaustion.

16. The method according to claim 15, wherein said predicting comprises incorporating one of effects of variance on an extrapolated trend, incorporating time integral tests for secondary indicators, and including increased degrees of variance as symptomatic of outages.

17. The method according to claim 15, wherein said predicting comprises using a plurality of indicators in combination to form a predictor of said outage.

18. The method according to claim 17, wherein no one of said indicators is necessarily at a global extreme.

19. The method according to claim 15, wherein said predicting comprises using a single indicator which is approaching a predetermined threshold.

20. The method according to claim 17, wherein said indicators are used to identify which of any of at least one of a subsystem, a process, and a thread are causing the resource exhaustion.

21. The method according to claim 9, wherein said avoiding comprises automatically performing selective software rejuvenation, without operator intervention.

22. The method according to claim 9, wherein said rejuvenation is performed for one of a portion of said system and an entirety of said system.

23. The method according to claim 9, wherein said rejuvenation is invoked within a cluster environment, and cluster management failover services are used to stop an offending subsystem controllably and to restart said offending subsystem on one of a same node and another node in the cluster.

24. The method according to claim 23, further comprising:
    prior to invoking rejuvenation in the cluster, checking a fail-to node of the cluster to confirm that said fail-to node has adequate resources to accept the failed-over workload.

25. The method according to claim 24, further comprising:
    if the resource check fails, then informing a system operator that the fail-to node cannot accept the failed-over workload, and alerting the operator of the system's inability to perform rejuvenation.

26. The method according to claim 25, wherein said operator takes corrective action to restore the system's fault resilience by at least one of adding processors, adding memory, adding I/O devices, adding storage, and rejuvenating the fail-to node to free resources consumed by aging on said fail-to node.

27. The method according to claim 9, wherein said avoiding includes rejuvenating at least part of said system, said rejuvenation being performed by rejuvenating only prior to an unplanned outage.

28. The method according to claim 27, further comprising:
   identifying exactly which of at least one of a subsystem, process, and thread is responsible for the resource exhaustion, such that only an offending one of said at least one of said subsystem, process, and thread is rejuvenated.

29. The method according to claim 28, wherein said identifying comprises non-intrusively monitoring and analyzing a state of said software system so as to predict an impending resource exhaustion-induced outage.

30. The method according to claim 28, wherein an aggregation of indicators is performed during said identifying to provide a reliable predictor of impending outage.

31. The method according to claim 30, further comprising:
   when said aggregation of said indicators approaches a region associated with an increased likelihood of unplanned outage, notifying said system operator to initiate a planned outage.

32. The method according to claim 31, wherein said rejuvenation based on identification of said indicators is performed during a next acceptable interval.

33. The method according to claim 9, wherein said rejuvenation is performed, transparently to an application software of said system, based on measuring an earlier one of at least one of elapsed time and indicative symptoms, and by signaling an impending unplanned outage to one of an operator and a cluster management software to perform a planned rejuvenation.

34. A method for software rejuvenation, comprising:
   waiting for symptoms associated with an imminent outage of software of a software system;
   determining whether a fail-to node has adequate resources to accept a failover workload;
   if the determining determines the fail-to node can accept the failover workload, then a rejuvenation agent on a first node instructing a cluster manager to shut down an open application in a pre-planned manner on the first node; and
   restarting the application on a second node without modifying the application running on said first node.

35. The method according to claim 34, further comprising:
   if said determining determines that the fail-to node cannot accept the failover workload, then sending an alert that adequate resources do not exist to support fault tolerance requirements; and
   suspending rejuvenation until an operator acknowledges and corrects a deficiency.

36. The method according to claim 35, wherein said first node comprises a primary node and said second node comprises a secondary node, further comprising:
   designating, by the cluster manager, the second node as a new primary node, and the first node as a new secondary node.

37. The method according to claim 34, further comprising:
   after said waiting, selecting an appropriate rejuvenation time.

38. A system for increased software dependability, comprising:
   a learning unit for learning how to predict an outage of a software system running on a computer;
   a predictor for predicting, based on an output from said learning unit, an imminent outage of said software system; and
   a rejuvenation agent for avoiding the outage, wherein the rejuvenation agent rejuvenates said software without modifying an application running in said software system.

39. A system for increasing software dependability, comprising:
   a sensing unit for sensing symptoms associated with an imminent outage of said software;
   a determiner for determining whether a fail-to node has adequate resources to accept a failover workload upon said sensing unit sensing said symptoms; and
   a rejuvenation agent, based on an output from said determining unit that the fail-to node cannot accept the failover workload, and for sending an alert that adequate resources do not exist to support fault tolerance requirements, said rejuvenating agent suspending rejuvenation until an operator acknowledges and corrects a deficiency,
   wherein said rejuvenation agent rejuvenates said software without modifying an application running in said software system.

40. A system for increased software dependability, comprising:
   means for learning how to predict an outage of a software system running on a computer;
   means for predicting, based on an output from said learning means, an imminent outage of said software system;
   means for avoiding the outage; and
   means for performing software rejuvenation without modifying an application running in said software system.

41. A signal-bearing medium tangibly embodying a program of machine-readable instructions executable by a digital processing apparatus to perform a method for increasing software dependability, said method comprising:
   learning how to predict an outage of a software system running on a computer;
   based on said leaning, predicting an imminent outage;
   avoiding the outage; and
   rejuvenating said software without modifying an application running in said software system.

42. A signal-bearing medium tangibly embodying a program of machine-readable instructions executable by a digital processing apparatus to perform a method for computer-implemented dependability of software, said method comprising:
   waiting for symptoms associated with an imminent outage of a software system;
   determining whether a fail-to node has adequate resources to accept a failover workload;
   if said determining determines that the fail-to node cannot accept the failover workload, sending an alert that adequate resources doe not exist to support fault tolerance requirements;
   suspending rejuvenation until an operator acknowledges and corrects a deficiency; and
   rejuvenating said software without modifying an application running in said software system.

* * * * *